United States Patent [19]

Mizuyama et al.

[11] 4,347,451

[45] Aug. 31, 1982

[54] SALIENT POLE DYNAMOELECTRIC MACHINE

[75] Inventors: Akinori Mizuyama, Komae; Tadahisa Ogita, Yokohama, both of Japan

[73] Assignee: Tokyo Shibaura Denki Kabushiki Kaisha, Kawasaki, Japan

[21] Appl. No.: 141,659

[22] Filed: Apr. 18, 1980

[30] Foreign Application Priority Data

Apr. 25, 1979 [JP] Japan .................................. 54-50252

[51] Int. Cl.³ .............................................. H02K 9/04
[52] U.S. Cl. .................................. 310/59; 310/60 A; 310/63
[58] Field of Search .................. 310/52, 53, 54, 55, 310/56, 57, 58, 59, 60 R, 60 A, 61, 62, 63, 64, 65

[56] References Cited

U.S. PATENT DOCUMENTS 3,588,557  6/1971  Kilgore .................................. 310/60
3,921,018  11/1975  Frankenhauser ..................... 310/59

FOREIGN PATENT DOCUMENTS 664705   5/1965  Belgium .
745989   2/1970  Belgium .
507818   9/1930  Fed. Rep. of Germany .
52-1402  1/1977  Japan .
54-7308  1/1979  Japan .
355658   8/1931  United Kingdom .

Primary Examiner—J. V. Truhe
Assistant Examiner—Morris Ginsburg
Attorney, Agent, or Firm—Oblon, Fisher, Spivak, McClelland & Maier

[57] ABSTRACT

With a salient pole dynamoelectric machine embodying this invention, the inner peripheral wall of the stator is covered with a partition wall which is formed of a cylindrical base wall spaced from the inner peripheral wall of the stator at a prescribed distance and annular rims formed at both ends of the cylindrical base wall. Air inlet chambers each containing a blower and air outlet chamber each containing an air cooler are alternately arranged in a circumferential direction on the outer peripheral wall of the stator. Application of the partition wall enables to stator and rotor both be separately cooled by the corresponding exclusive blowers, thereby ensuring the efficient cooling of the dynamoelectric machine, and reduction in cooling motive power and blower pressure.

11 Claims, 13 Drawing Figures

F I G. 6
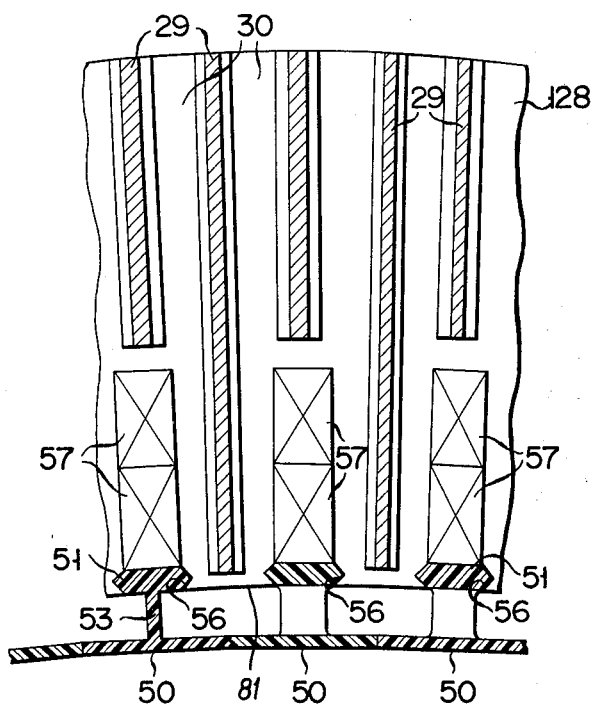
F I G. 7
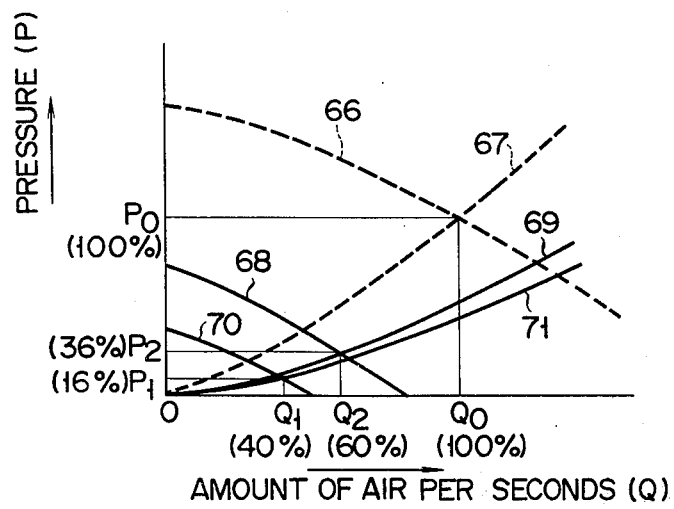

SALIENT POLE DYNAMOELECTRIC MACHINE

BACKGROUND OF THE INVENTION

1. Field of the Invention

This invention relates to a salient pole dynamoelectric machine, and more particularly to a salient pole dynamoelectric machine whose stator and rotor can be separately cooled by means of a forced draft supplied from the respective exclusive blowers.

2. Description of the Prior Art

The conventional generator motor used in a pumped-storage power station is so arranged that cooling air is supplied to a stator and rotor by means of the same blowers; and hot air resulting from the heat expelled from the stator and rotor is cooled by air coolers, and circulated through the blowers to effect forced draft cooling.

Referring to FIG. 1, forced draft cooling blowers 1 fixed to a stator frame 2 introduce air into a housing 3 of a salient pole dynamoelectric machine in the direction of an arrow A shown in FIG. 1. Same portion of the air is conducted into spaces defined between the salient poles 4 of a rotor 5 in the direction of an arrow B. The other portion of the air passes through vent holes 6 formed in a rotor spider 7 and is brought into the rotor spider 7 as shown by an arrow C. Thereafter, this other portion of the air flows through radially extending air passageways 8 formed in a rotor rim 9 and then through the spaces defined between the salient poles 4 of the rotor 5 in the direction of arrows D. Thus, both portions of the air cool rotor coils of the rotor 5 and pole cores, thereby eventually cooling the rotor 5 itself to a desired level of temperature.

The air which has cooled the rotor 5 flows through an air gap 11 provided between the rotor 5 and stator 10 and flows into a stator air duct 12 in the direction of arrows E to cool the stator core and stator coils and eventually the stator 10 itself. Thereafter, the air which has now become hot is sent to air coolers 13 in the direction of arrows F. The hot air is cooled by the cooler 13 to a prescribed level of temperature and again enters a circulation route.

With the prior art salient pole dynamoelectric machine, however, the cooling air first flows through the rotor 5 and then through the air gaps 11 defined between the rotor 5 and stator 10 and is finally sent to the stator 10. Where, therefore, the rotor 5 gives rise to rotor loss in the air gap 11, the air is more heated by the extent of the rotor loss. After heated by the rotor 5, the cooling air flows through the stator 10 to carry away heat therefrom. Consequently, it has hitherto been necessary to apply a considerable amount of cooling air per second for thorough cooling of the rotor 5 and stator 10. The further disadvantage of the conventional cooling method is that since cooling air enters spaces defined between the poles 4 through various passageways, air stream conflict with each other, resulting in windage loss and consequently a decline in cooling efficiency.

Particularly with an ultra high speed large capacity generator motor in which the peripheral speed of the rotor exceeds 130 meters per second, it is necessary to apply a tremendous amount of cooling air per second. As things stand at present, however, it is impossible to provide an interpole space having a sufficiently large cross section to allow for the flow of such enormous amount of cooling air. Accordingly, limitation is imposed on the amount of cooling air which can be applied, probably failing to sufficiently cool the rotor and stator. As a result, the conventional cooling process further includes letting water streams flow in the rotor and/or stator for cooling. However, this arrangement complicates the construction of a cooling system, unavoidably rendering a dynamoelectric machine expensive and moreover possibly resulting in the serious danger of water leakage.

SUMMARY OF THE INVENTION

The object of this invention is to provide a large capacity salient pole dynamoelectric machine in which a rotor and stator can be separately cooled by the respective exclusive blowers and air coolers.

A salient pole dynamoelectric machine embodying this invention includes a rotary central shaft, rotor concentrically fixed thereto and stator concentrically arranged with the rotor. The rotor is formed of salient poles arranged in a circumferential direction on the peripheral wall of the rotor and rotor coils wound about the salient poles. The stator includes stator core members superposed one atop another in the axial direction, and spaced from each other at a prescribed distance by radially extending spacers, and stator coils which are inserted into radial slots formed in the stator coil members by means of wedges fixing one end of the respective coils.

A partition wall is set at a prescribed distance from the inner peripheral wall of the stator coils to obstruct communication between the interiors of the stator coils and rotor. Air inlet chambers which communicate with the interior of the stator and receive air from respective blowers, and air outlet chambers from which heated air is conducted to respective air coolers are alternately arranged in a circumferential direction on the peripheral wall of the stator. Further, a stator frame is fitted with separate blowers and air coolers. This arrangement lets cooling air pass through the spaces defined between the salient poles of the rotor to carry away heat from the rotor and conducts the heated air to the air coolers. Therefore, the stator and rotor are separately cooled, enabling an air-cooling system to sufficiently serve the purpose even for a large capacity dynamoelectric machine, and offering the advantage of simplifying the construction of the dynamoelectric machine, reducing its manufacturing cost, and also noticeably saving a motive power for the run of cooling air.

BRIEF DESCRIPTION OF THE DRAWINGS

This invention can be fully understood from the following detailed description with reference to the accompanying drawings, in which:

FIG. 6 is a fractional plan view of the components of the stator partition wall fitted to the stator;

FIG. 7 shows a graph comparing the ventilation characteristics of the dynamoelectric machine of this invention with that of the prior art.

DETAILED DESCRIPTION OF THE PREFERRED EMBODIMENTS

Figure 1:
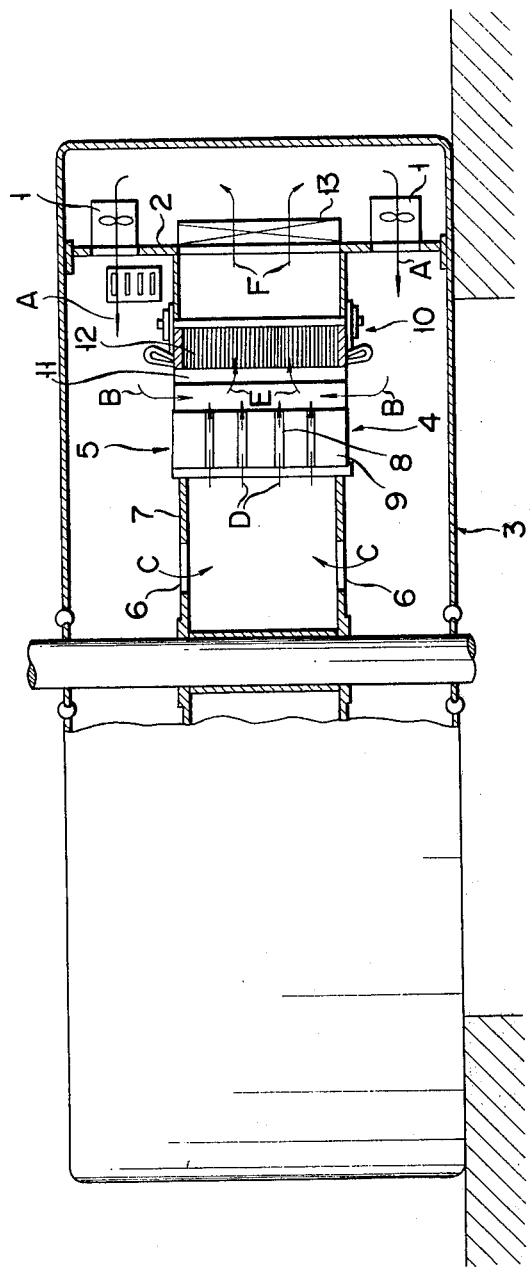
FIG. 1 is a vertical sectional view of the known salient pole dynamoelectric machine.
Figure 2:
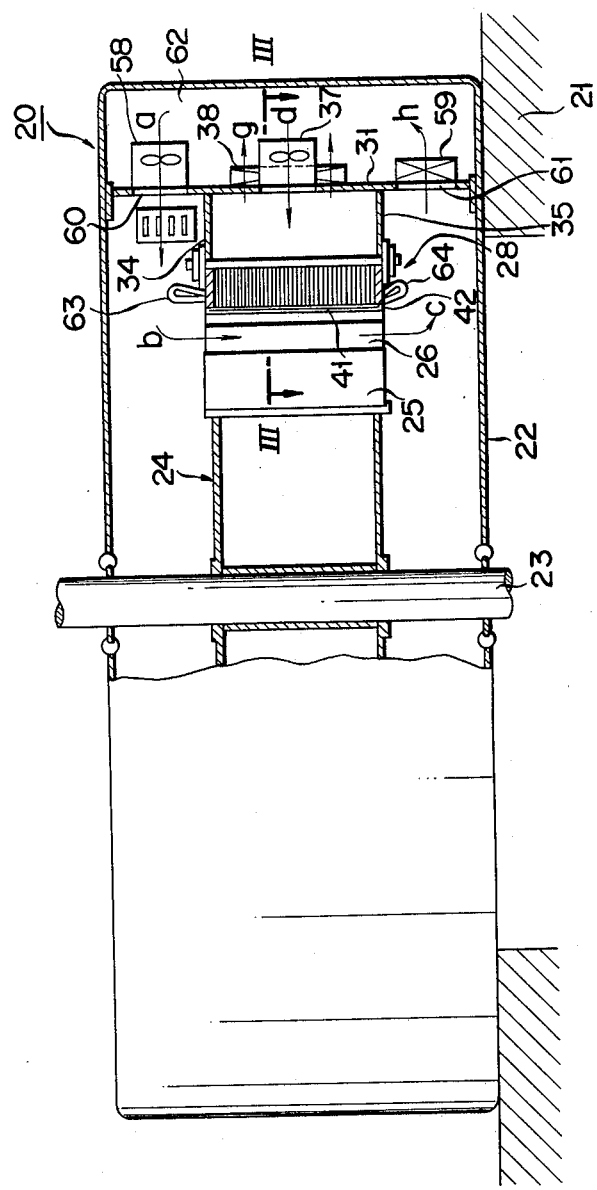
FIG. 2 is a vertical sectional view of a salient pole dynamoelectric machine according to one embodiment of this invention.
Figure 3:
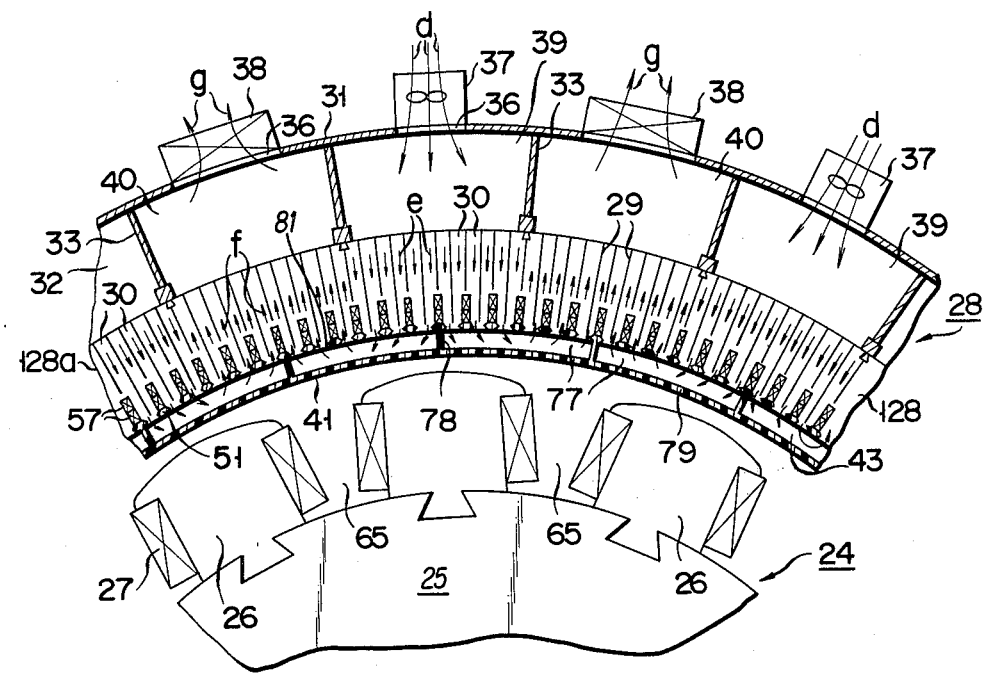
FIG. 3 is a fractional horizontal cross-sectional view of FIG. 2 along line III—III.

Referring to FIGS. 2 and 3, a salient pole dynamoelectric machine 20 according to one embodiment of this invention includes a hollow cylindrical housing 22 mounted on a foundation 21 and a rotary central shaft 23 rotatably erected at the center of the housing 22. In the housing 22, a cylindrical rotor 24 whose peripheral wall is a rotor rim 25 (FIG. 2) is concentrically fixed to the central shaft 23. Salient poles 26 wound with rotor coils 27 are arranged in a circumferential direction on the peripheral wall of the rotor 24.

A stator 28 is disposed concentrically with the rotary central shaft 23 and rotor 24 and includes a stator core 128 each formed of mutually superposed discs 128a. The discs 128a of the core 128 are spaced from each other at a prescribed distance by radially extending spacers 29 each having an I-shaped cross section. The adjacent spacers 29 and core discs 128a disposed above and below the spacers 29 jointly constitute stator air ducts 30 (FIG. 3).

Referring to FIGS. 2 and 3, a stator frame 31 is disposed in the housing 22 concentrically with the central shaft 23 and surrounds the stator 28. The upper and lower edges of the stator frame 31 are fixed to the upper and lower end portions of the housing 22.

As seen from FIG. 3, an annular space 32 defined between the periphery of all the stator core 128, and the stator frame 31 is divided into equal parts by the partition plates 33 in the circumferential direction. The upper and lower sections of the annular space are respectively plugged or closed with ring-shaped top member 34 and bottom member 35. Therefore, the stator frame 31, partition plates 33, top member 34, and bottom member 35 collectively define a plurality of chambers 39, 40 open to the stator core 128. Openings 36 are formed in the outer walls of these chambers, that is, the stator frame 31. Alternately provided in a circumferential direction on the outer walls of these chambers are stator-cooling blowers 37 for introducing cooling air into the chambers and stator air coolers 38. The blowers 37 and air coolers 38 are disposed in the openings 36. As used herein, a chamber 39 in which the stator-cooling blower 37 is set is referred to as "an air inlet chamber," and a chamber 40 in which the air cooler 38 is installed is referred to as "an air outlet chamber."

Referring to FIGS. 2 and 3, a substantially cylindrical partition wall 41 is provided in the stator 28 at a distance of 20 to 30 millimeters from the inner wall 81 of the stator core 128 as against the inner diameter of, for example, 3 to 5 meters of the stator core 128. Both ends top and bottom of the cylindrical partition wall 41 are fitted with a flange or annular rims 42 (FIGS. 2 and 3) for closing an annular space 43 defined between the partition wall 41 and stator core 128. The partition wall 41 is constructed by assembling the components 44, 45, 46, 47, 48, 49 respectively shown in FIGS. 4A to 4F. Each partition component includes a rectangular base board 50 and a connecting position or wedge 51 having a flattened hexagonal cross section. Both lateral sides of the wedge 51 are provided at the center with an air passage notch 52. The partition components 44 to 46 are each provided with a partition rib 53 spanning the central portions of the mutually facing lateral walls of the base board 50 and wedge 51 at right angles to the base board 50 and wedge 51.

Figure 4A:
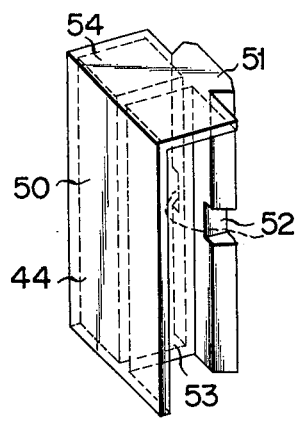
FIGS. 4A to 4F are oblique views of the components of a stator partition wall according to one modification.
Figure 4D:
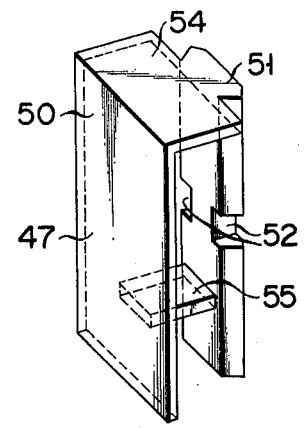
Figure 4B:
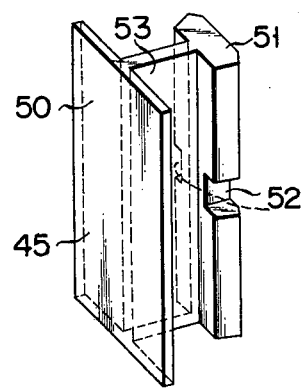
Figure 4E:
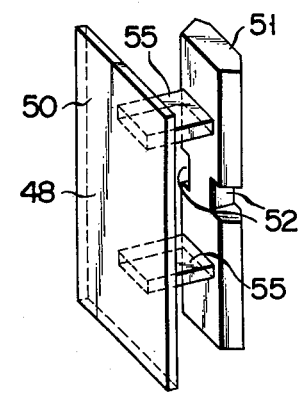
Figure 4C:
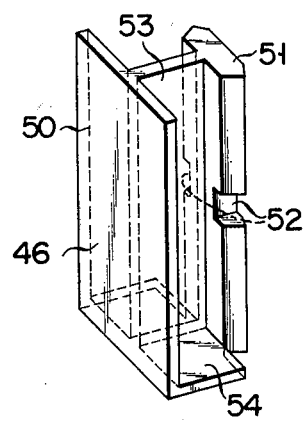
Figure 4F:
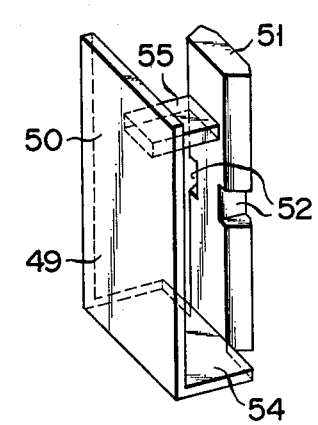

Provided at one end of each of the partition components 44, 46 is an end plate 54 which is set at right angles to the base board 50 and partition rib 53 to connect one end of the base board 50 and that end of the wedge 51 which faces one end of the base board 50 (FIGS. 4A and 4C). As shown in FIGS. 4D and 4F, one end of each of the partition components 47, 49 is provided with an end plate 54 which is set at right angles to the base board 50 to connect the mutually facing lateral sides of the base board 50 and wedge 51. The partition components 47, 49 are each provided with a connecting rib 55 for connecting the intermediate parts of the base board 50 and wedge 51. The connecting rib 55 is a rectangular member set in parallel with the end plate 54. When the partition wall 41 is assembled, the partition components 44, 46 are set, as shown in FIGS. 4A and 4C, in a state vertically reversed from each other. Similarly, the partition components 47, 49 are disposed, as illustrated in FIGS. 4D and 4F, in a state turned upside down relative to each other.

The partition component 48 includes a base board 50, wedge 51 and a plurality of connecting ribs 55 (two in the embodiment). The connecting ribs 55 shown in FIG. 4E have the same shape as those of the partition components 47, 49, and are set in parallel with each other and at right angles to the center lines of the base board 50 and wedge 51. The partition components 44 to 49 are each integrally prepared from a heat-resistant synthetic resin such as fabric-base phenolic material. However, it is possible to first fabricate the wedge 51 and connect it to the other members of the partition component.

As seen from FIG. 6, the wedges 51 of the partition components 44 to 49 are fixed into slots 56 opened at the inner peripheral wall of the stator core 128. Stator coils 57 disposed in the slots 56 in the stator core 128 is connected to the respective wedges 51.

Figure 5:
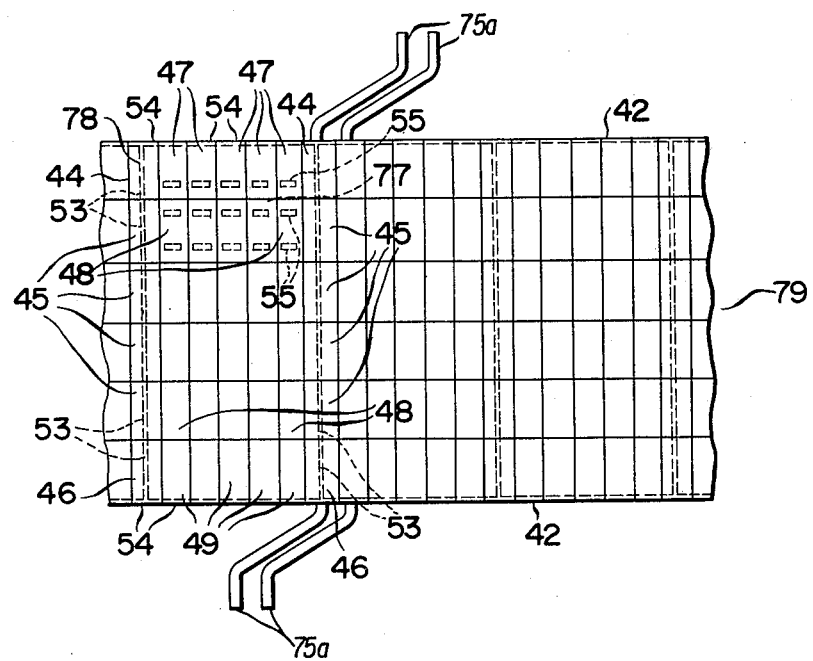
FIG. 5 is a part of a development view, as seen from the rotor, of the stator partition wall constructed by assembling the components of FIG. 4.

The partition wall 41 is constructed by assembling the partition components 44 to 49 in the following manner. As shown in FIG. 6, the wedges 51 are inserted into the slots 56 of the stator core 128 which face the central parts of the air inlet chambers 39 and air outlet chambers 40. The partition components 44, 46 (hereinafter referred to as "partition rib-bearing edge partition components") are arranged on both lateral edge portions of the partition wall 41. The partition components 45 (hereinafter referred to as "partition rib-bearing intermediate partition components") are positioned between the coupling rib-bearing edge partition components 44, 46. The adjacent coupling rib-bearing edge partition components 44 are connected by partition components 47. The adjacent coupling rib-bearing edge partition components 46 are connected by partition components 49. The partition components 47, 49 are hereinafter referred to as "coupling rib-free edge partition components". The coupling rib-free edge partition components 47 and 49 are connected by a series of the coupling rib-bearing intermediate partition components 48. The end plates 54 of all the edge partition components 44, 46, 47 and 49 are always set on the outside of the partition wall 41, and collectively constitute the annular rim 42 (FIGS. 2 and 3). The base boards 50 of the partition components 44 to 49 jointly constitute a cylindrical base wall 79 as shown in FIG. 5 75a shows the coil ends of the stator coils. The partition ribs 53 of the partition components 44 to 46 collectively form a partition element 78 (FIG. 3) extending axially of the cylindrical base wall 79. The adjacent series of the connecting ribs 55 jointly constitute circumferential passageways 77 through which a cooling air flows circumferentially of the cylindrical base wall 79.

Reverting to FIG. 2, rotor-cooling blowers 58 are disposed above the top member 34 of the stator frame 31, and rotor air cooler 59 are set below the bottom member 35 of the stator frame 31. The rotor-cooling blowers 58 and rotor air cooler 59 are selected according to the capacity and construction of a dynamoelectric machine so as to have a proper number of them. It is only necessary that they be located in positions suitable to supply air from an air chamber 62 created along the inner surface of the housing 22 as well as to receive the discharge of air to the air chamber. The rotor-cooling blowers 58 conduct cooling air into the stator frame 31 through holes 60 formed in the stator frame 31. The air cooler 59 cools hot air flowing from the rotor 24 through other holes 61 formed in the stator frame 31. Reference numeral 75a of FIG. 5 shows part of the wires of the stator 28.

In operation, the blowers 37, 58 and air coolers 38, 59 are started, part of the cooling air in an air chamber 62 disposed outside of the stator frame 31 and in the housing 22 is conducted under pressure toward the rotary central shaft 23 by the stator blowers 58 in the direction of an arrow a indicated in FIG. 2 to cool the upper stator coil end 63, and flows down in the direction of the arrows b, c through the spaces 65 (FIG. 3) defined between the salient poles 26 of the rotor 24. During the downward flow, the air cools the rotor 24 to a prescribed temperature. While further cooling a lower coil end 64 (FIG. 2), the cooling air flows through the air coolers 59 in the direction of an arrow h and is heat-exchanged to be cooled substantially to that level of temperature at which the air stood just before carried into the dynamoelectric machine by the stator blowers 58.

Part of the air in the air chamber 62 is brought into the air inlet chambers 39 in the direction of arrows d (FIGS. 2 and 3). Thereafter, the air flows toward the rotary central shaft 23 in the direction of arrows e through the air duct 30 (FIG. 3) defined by the upper and lower stator core discs 128a and adjacent spacers 29. Then, the air flows through the annular space 43 defined between the base wall 79 of the partition wall 41 and the inner peripheral wall of the cylindrical stator core 128. The air further flows in the direction of arrows f toward the air outlet chambers 40 through the air ducts 30 facing the air outlet chambers 40 adjacent to the air inlet chambers 39 into which the air has been introduced. During the above-mentioned flow, the cooling air cools the stator core 128 and stator coils 57 to a prescribed level of temperature. The hot air brought into the air inlet chambers 40 is heat-exchanged to be cooled substantially to the original low temperature while flowing through the air coolers 38 in the direction of an arrow g. Thereafter the air flows into the air chamber 62. The air streams flowing out of the air coolers 38, 59 travel through the aforesaid circulation route and respectively cool the stator 28 and rotor 24. Each partition element 78 which faces the central part of the corresponding air inlet chamber 39 causes halves of air streams delivered from the air inlet chamber 39 to flow smoothly through the annular space 43 in the circumferentially opposite directions. With respect to each partition element 78 which faces the central part of the corresponding air outlet chamber 40, air streams flowing through the annular space 43 in the directions in which they tend to be drawn toward each other are diverted outward radially of the cylindrical stator 28, and consequently are prevented from colliding against each other with the resultant occurrence of turbulences. Therefore, the partition rib 53 eliminates the generation of unnecessary heat and the heat loss of cooling air. The connecting rib 55 not only acts to connect the wedge 51 to the base board 50, but also plays the part of guiding air streams circumferentially of the annular space 43.

Now, let it be assumed that the total heat loss of a salient pole dynamoelectric machine is expressed as $L_0$; the rotor loss as $L_1$; and the stator loss as $L_2$. Then, the following equations generally result.

$$\left.\begin{array}{l} L_1 = 0.4 L_0 \\ L_2 = 0.6 L_0 \end{array}\right\} \qquad (1)$$

$$L_0 = L_1 + L_2 \qquad (2)$$

Further, let it be assumed that with the salient pole dynamoelectric machine embodying this invention, the amounts of cooling air supplied to the rotor 24 and stator 28 are respectively expressed as $Q_1 m^3/sec$ and $Q_2 m^3/sec$; and the total amount of cooling air as $Q_0 m^3/sec$. Since the cooling air can be made to rise in temperature by the same extent after cooling the rotor 24 and stator 28, the following equations result from the equations (1) and (2).

$$\left.\begin{array}{l} Q_1 = 0.4 Q_0 \\ Q_2 = 0.6 Q_0 \end{array}\right\} \qquad (3)$$

In this case, it is assumed that the following equation is established.

$$Q_0 = Q_1 + Q_2$$

Where, therefore, the rotor 24 is supplied with 40% of the total amount $Q_0$ of cooling air, and the stator 28 receives 60% of the total amount $Q_0$ of cooling air, the rotor 24 and stator 28 can be cooled to the same level of temperature.

Referring to FIG. 7, a broken line curve 66 denotes the PQ characteristic (characteristic of air pressure versus air quantity) of the conventional salient pole dynamoelectric machine, and a broken line curve 67 shows the ventilation loss characteristic of the prior art dynamoelectric machine. In contrast, solid line curves 68, 69 respectively represent the PQ characteristic of the stator of the present salient pole dynamoelectric machine having the same capacity as the conventional type and the ventilation loss characteristic of the stator of the present dynamoelectric machine. Solid line curves 70, 71 respectively denote the PQ characteristic of the rotor of the present dynamoelectric machine and the ventilation loss characteristic of the rotor. The junction of the PQ characteristic curve and ventilation loss characteristic curve represents a point of time at which the cooling air blower can be effectively operated. Where the amounts $Q_0$, $Q_1$, $Q_2$ of cooling air are respectively supplied to the rotor of the prior art dynamoelectric machine and the stator and rotor of the present dynamoelectric machine, the cooling air blowers can be operated effectively. Ventilation losses (as measured in pressure) related to the amounts $Q_0$, $Q_1$, $Q_2$ of cooling air are respectively expressed as $P_0$, $P_1$, $P_2$.

With a salient pole dynamoelectric machine, the ventilation loss P (mmAq) is generally proportional to the square of the amount Q (m³/sec) of air. Therefore, the following equations result.

$$P_0 = \alpha_0 Q_0^2 \\ P_1 = \alpha_1 Q_1^2 \quad (4)$$

$$P_2 = \alpha_2 Q_2^2$$

where $\alpha_0$, $\alpha_1$, $\alpha_2$ are proportion constants.

From FIG. 7 the following expression results:

$$\alpha_0 > \alpha_1 > \alpha_2 > 0 \quad (5)$$

Therefore, the following expressions are derived from the expressions (3), (4) and (5).

$$P_1 = 0.4^2 \cdot \frac{\alpha_1}{\alpha_0} \cdot P_0 < 0.4^2 P_0 \\ P_2 = 0.6^2 \cdot \frac{\alpha_2}{\alpha_0} \cdot P_0 < 0.6^2 P_0 \quad (6)$$

A power W KW required for blowers capable of generating a pressure P mmAq and air amount Q m³/sec is expressed as $$W = \beta \cdot P \cdot Q \quad (7)$$

where $\beta$ is a proportion constant.

Now let it be assumed that a power required for the blowers of the prior art dynamoelectric machine is expressed as $W_0$ KW, and powers required for the blowers of the rotor and stator of the present dynamoelectric machine are respectively expressed as $W_1$ KW and $W_2$ KW. Then the following expression result.

$$W_0 = \beta \cdot P_0 \cdot Q_0 \\ W_1 = \beta \cdot P_1 \cdot Q_1 = (0.4)^3 \frac{\alpha_1}{\alpha_0} W_0 < 0.4^3 W_0 \quad (8)$$

$$W_2 = \beta \cdot P_2 \cdot Q_2 = (0.6)3 \, (\alpha_1/\alpha_0) W_0 < 0.6^3 W_0$$

the following expression results from the experssions (8).

$$W_1 + W_2 < 0.28 \, W_0 \quad (9)$$

Therefore, it is apparent from the expressions (6) that the pressures of cooling air supplied to the rotor and stator of the present dynamoelectric machine respectively account for less than 16% and 36% of the pressure of cooling air supplied in common to the rotor and stator of the prior art dynamoelectric machine. Consequently, the present dynamoelectric machine allows for the easy design of a cooling air blowers.

It is seen from the expression (9) that power necessary for the dynamoelectric machine of this invention accounts for less the 28% of what is required for the prior art dynamoelectric machine. This means that the present dynamoelectric machine ensures noticeable saving in motive power requirement.

Figure 8:
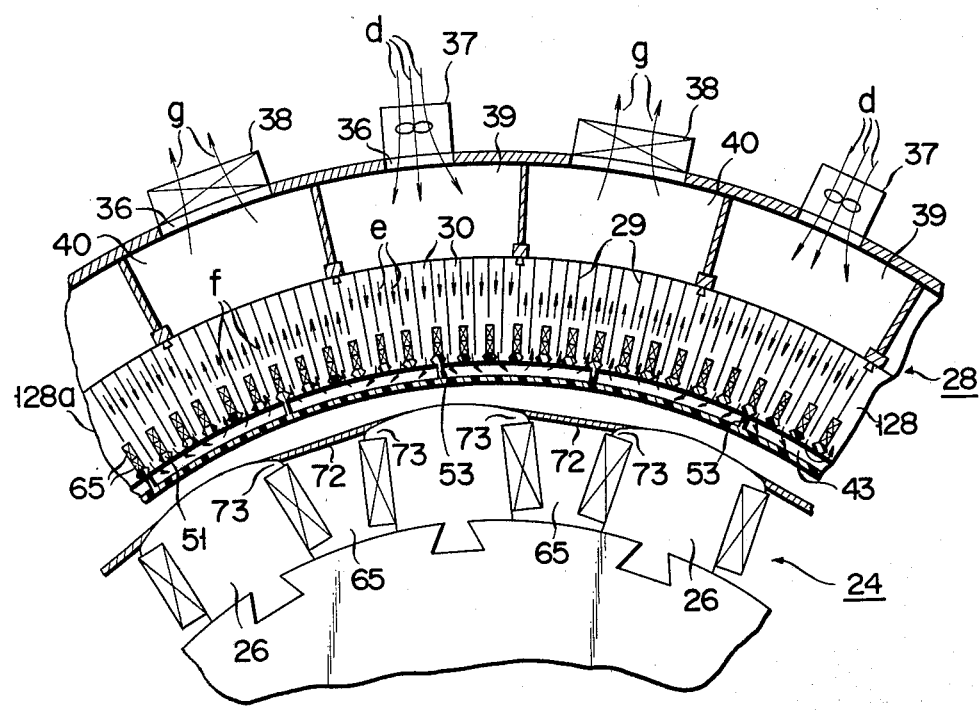
FIG. 8 is a fractional horizontal sectional view of a salient pole dynamoelectric machine according to another embodiment of the invention.

FIG. 8 is a horizontal sectional view of a salient pole dynamoelectric machine according to another embodiment of this invention. This second embodiment is different from the preceding embodiment only in that a partition board 72 prepared from a nonmagnetic material such as aluminum or stainless steel with the same length as the width of a salient pole 26 spans a space defined between the mutually facing upper edges of the respective adjacent salient poles 26. The parts of FIG. 8 the same as or similar to those of FIG. 3 are denoted by the same numerals, description thereof being omitted.

The partition boards 72 shut off spaces defined between the respective salient poles 26 from an annular groove formed between the rotor 24 and stator 28, thereby offering the advantage of suppressing the occurrence of turbulences of air and saving windage loss. Further, the outer planes of the respective salient poles 26 and the partition boards 72 indicate a substantially circular locus alike when they are turned, thereby preventing heat from being generated in the rotor 24 during its rotation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A salient pole dynamoelectric machine comprising:
a cylindrical housing;
a central rotary shaft disposed in the center of said housing;
a rotor rotatably disposed in said housing on said central rotary shaft having an outer peripheral wall fitted with a plurality of circumferentially arranged adjacent salient poles and having airflow spaces defined between said adjacent salient poles;
a stator having an outer peripheral wall and an inner peripheral wall and disposed in said housing to concentrically surround said rotor, wherein said stator inner peripheral wall is fitted with circumferentially arranged stator coils having stator coil ends extending beyond said stator inner peripheral wall;
a cylindrical partition wall which further comprises a cylindrical base wall circumferentially spaced a prescribed distance from said inner peripheral wall of said stator and a plurality of annular rims formed on both a top and bottom end of said cylindrical base wall, said cylindrical base wall and said annular rims cooperating to completely enclose said inner peripheral wall of said stator;
a plurality of air inlet chambers and air outlet chambers circumferentially alternately arranged between said outer peripheral wall and said inner peripheral wall of said stator;
first blower means communicating with said air inlet chambers for conducting air into said stator;
first air cooler means disposed adjacent said air outlet chambers for cooling hot air delivered from said stator;
second blower means provided on said housing for supplying air to said airflow spaces between said adjacent salient poles of said rotor; and second air cooler means provided on said housing for cooling hot air drawn from said airflow spaces defined between said adjacent salient poles of said rotor.

2. The dynamoelectric machine according to claim 1, wherein said cylindrical base wall further comprises a plurality of partition elements radially projecting from said cylindrical base wall so as to face central parts of said air inlet chambers and said air outlet chambers.

3. The dynamoelectric machine according to claim 2, wherein said cylindrical base wall further comprises a plurality of closely arranged base boards having lateral outer ends.

4. The dynamoelectric machine according to claim 3, wherein said plurality of annular rims further comprises a plurality of end plates fitted to said lateral outer ends of said base boards.

5. The dynamoelectric machine according to claim 4, wherein each of the partition elements further comprises a plurality of linearly arranged radially extending ribs each having a connecting portion at an outer radial end of each of said ribs, said ribs axially extending from the inner walls of said respective base boards, so as to face the central parts of the air inlet chambers and the air outlet chambers such that each connecting portion is connected to said stator inner peripheral wall so as to hold the base boards to the stator.

6. The dynamoelectric machine according to claim 1, further comprising air stream guide means circumferentially arranged on the inner peripheral surface of said cylindrical partition wall.

7. The dynamoelectric machine according to claim 6, wherein the cylindrical base wall further comprises a plurality of closely arranged base boards having an inner surface.

8. The dynamoelectric machine according to claim 7, wherein said air stream guide means further comprises a plurality of ribs each having a connecting portion, said ribs being linearly arranged radially outward of said cylindrical base wall on said inner surface of said base boards so as to connect said base boards to said stator inner peripheral wall.

9. The dynamoelectric machine according to claim 5 or 8, wherein said stator inner peripheral wall further comprises a plurality of slots formed therein and said connecting portion further comprises wedge means securely inserted into said slots of said stator to support said stator coils in said slots.

10. The dynamoelectric machine according to claim 1, further comprising partition boards bridging said airflow spaces defined between said adjacent salient poles.

11. The dynamoelectric machine according to claim 1, wherein said second blower means further comprises means for supplying air to said stator coil ends.

* * * * *